Dec. 7, 1965     W. D. STOUT     3,222,106
VEHICLE SEAT
Filed Oct. 7, 1963
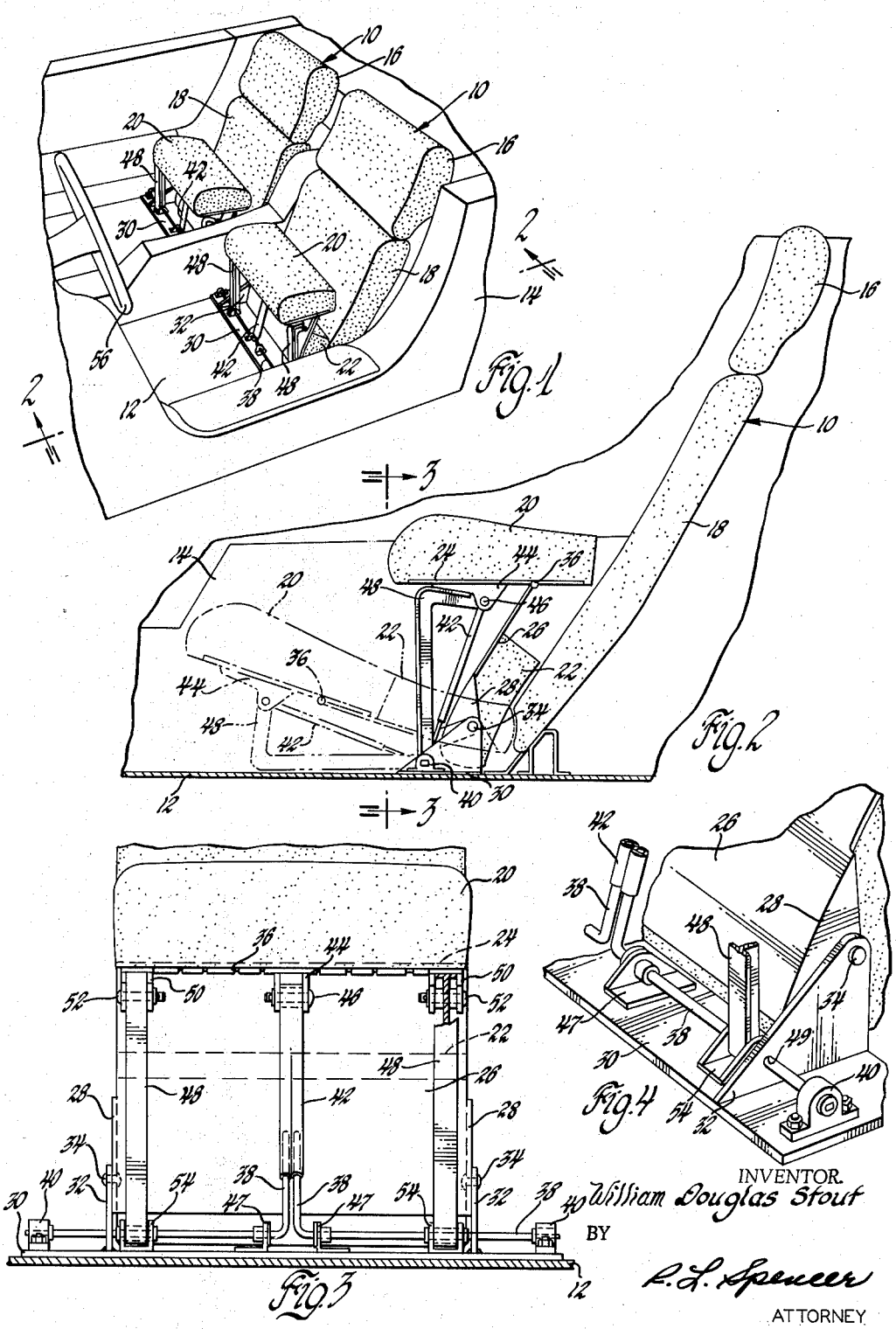
INVENTOR.
William Douglas Stout
BY
R. L. Spencer
ATTORNEY

United States Patent Office 3,222,106
Patented Dec. 7, 1965

3,222,106
VEHICLE SEAT
William Douglas Stout, Warren, Mich., assignor to General Motors Corporation, Detroit, Mich., a corporation of Delaware
Filed Oct. 7, 1963, Ser. No. 314,366
1 Claim. (Cl. 297—332)

This invention relates to a vehicle seat and more particularly to a folding easy entrance automobile seat.

With the increased usage of the modern sports car or compact vehicle, the entrance into and exit from the small cars has presented a problem to the average individual because of the limited leg room for entrance in the usual manner.

It is an object of this invention to provide a folding easy entrance seat for use in a sports car or a compact vehicle.

Another object of this invention is to provide a two-piece seat cushion for a sports car which is movable between a seat forming position and an easy entrance position for ease of entering and leaving the vehicle.

Another object of this invention is to provide linkage means for a two-part seat cushion for use in a sports car which will support the seat cushion in the seat forming position and in an easy entrance position and during movement between such positions.

Another object of this invention is to provide assist means for biasing the supporting linkages and moving a two-part seat from its seat forming position to an easy entrance position for ease in moving such a seat within a compact car.

These and other objects of this invention will become more apparent as reference is had to the accompanying specification and drawings wherein:

FIGURE 1 is a perspective view of a vehicle body, with sections cut away, showing a vehicle seat utilizing the present invention in the easy entrance position.

FIGURE 2 is a view taken substantially along the line 2—2 of FIGURE 1 showing a side view of the vehicle seat with the two-part seat cushion shown in the easy entrance position and, in phantom lines, in the seat forming position.

FIGURE 3 is a view taken substantially along the line 3—3 of FIGURE 2 showing the location and manner in which the assist torque rods and linkages are secured to the seat bottom and floor plate.

FIGURE 4 is a perspective view of the seat cushion in the easy entrance position, with sections broken away, showing the manner in which the linkages and rear seat pan are secured to the vehicle floor plate.

Referring now to the drawings, as best seen in FIGURES 1 and 2, a pair of vehicle seat assemblies 10 are supported on the floor 12 of a vehicle body 14. Since the seat assemblies are identical, only the driver's seat will be described.

The seat assembly 10 has a head rest 16 and a seat back unit or cushion 18 forming the back support and a two-part seat unit consisting of the front cushion 20 and the rear cushion 22 forming the seat support. The seat cushions 20 and 22 are movable between the easy entrance position, as shown in FIGURE 1 and as seen in solid lines of FIGURE 2, and the seat forming position, as shown in phantom lines of FIGURE 2. In the seat forming position, the cushions 20 and 22 are juxtaposed in an extended substantially horizontal plane with an edge of each cushion in close proximity to an edge of the other cushion. In the easy entrance position the front cushion 20 is in a substantially horizontal position above and to the rear of its seat forming position and the rear cushion 22 is rotated to a substantially vertical plane beneath the front cushion 20 and adjacent the seat back cushion 18.

The seat cushions 20 and 22 are secured to and supported on seat pan members 24, 26, respectively. The pan 26 for the rear seat cushion 22 has a pair of flanges 28 formed at right angles to the seat pan and extending along the side of the seat cushion 22. A floor plate 30 is secured to the vehicle floor 12 by bolts or other suitable means. A pair of support arms 32 are welded to the plate 30 and pivotally connected to the flanges 28 by rivets 34 for pivotally supporting the rear seat cushion 22 for movement between the seat forming position and the easy entrance position. The seat pan 26 is pivotally secured to seat pan 24 by a hinge 36 which extends the width of the seat pans. The hinge 36 effectively joins the seat pans 24 and 26 and supports the adjacent edges of the cushions 20, 22 in seat forming position. The pan 26 also supports one edge of cushion 20 in easy entrance position.

As best seen in FIGURES 3 and 4, a pair of L-shaped torque rods 38 have one end anchored against movement to the plate 30 by anchor brackets 40 and the other ends of the torque rods are secured in a coupling 42 which is pivotally secured to the seat pan 24 by a bracket 44 and bolt 46. The torque rods 38 are supported between the anchor bracket 40 and the coupling 42 by a pair of support brackets 47 secured to plate 30. The torque rods also pass through and are supported in an aperture 49 in support arms 32. The torque rods 38 are anchored so that the seat cushions 20 and 22 are biased to the easy entrance position. A pair of L-shaped support link members 48, made of T-channel, have one end pivotally connected to the seat pan 24 by brackets 50 and bolts 52. The other ends of the support members 48 are pivotally secured to the plate 30 by brackets 54 with the torque rods 38 acting as pintles for the pivotal connection thereto.

The support links 48 are adapted to contact the floor 12 in seat forming position and to contact bracket 50 in easy entrance position to support the front seat cushion 20 in the respective positions.

In operation, the seat cushions 20 and 22 are normally in the easy entrance position, as shown in solid lines of FIGURE 2. As viewed in FIGURE 2, the torque rods 38 exert a clockwise force relative to their axis extending between anchor bracket 40 and bracket 47, through the coupling 42 to the seat cushions 20 and 22, biasing them to the easy entrance position. To move the cushions 20 and 22 to the seat forming position, as shown in phantom lines in FIGURE 2, the occupant is seated on cushion 20 and exerts a forward and downward pressure on the seat cushion 20 by pushing against the seat back 18 and allowing his weight to settle on the cushion 20. These forces will cause the seat cushion 20 to rotate forwardly and downwardly, resiliently plastically deforming the torque rods 38 and moving the seat unit to the seat forming position, shown in phantom lines of FIGURE 2. Such movement of seat cushion 20 is accompanied by a counterclockwise rotation of seat cushion 22 about its pivot rivet 34 to the seat forming position by the force exerted on the seat pan 26 through the hinge 36. During the movement from the easy entrance position to the seat forming position, the occupant's legs will be extended forwardly and downwardly beneath the steering wheel 56 shown in FIGURE 1.

To leave the vehicle, the occupant supports part of his weight on adjacent portions of the vehicle body and assisted by the stressed torque rods moves the seat to its easy entrance position.

While but one embodiment of the present invention has been illustrated and explained it is obvious that numerous modifications are possible within the scope of this invention as defined by the following claim.

I claim:

A seat assembly having a seat back unit and a movable seat unit, said seat unit comprising a first member and a second member, said members having a juxtaposed seat forming position and a folded easy entrance position and being movable therebetween, support means for said seat unit including a plate adapted to be supported on a supporting floor, a support link having one end pivotally connected to said first member and the other end pivotally connected to said plate for supporting said first member in said positions and for controlling movement therebetween, a pivotal connection between said second member and said plate for supporting said second member in said positions and permitting rotative movement therebetween, a hinge connection between said members for controlling movement of said members relative to each other, and a torque rod for biasing said members to said easy entrance position, said torque rod having a fixed end secured to said plate and a movable arm connected to said seat unit whereby movement of said seat unit from easy entrance position increases the plastic deformation of said torque rod.

References Cited by the Examiner
UNITED STATES PATENTS

| | | | |
|---|---|---|---|
| 487,876 | 12/1892 | Jenson | 297—334 |
| 1,361,446 | 12/1920 | Conner et al. | 297—233 |
| 1,509,863 | 9/1924 | Erickson | 297—334 |
| 2,078,961 | 5/1937 | Meltzer | 297—331 |
| 2,338,814 | 1/1944 | Jones | 297—63 |
| 2,780,276 | 2/1957 | Valente | 297—338 |
| 2,797,732 | 7/1957 | Thomas | 248—373 |

FRANK B. SHERRY, *Primary Examiner.*